2 Sheets—Sheet 1.
B. B. HOTCHKISS.
MACHINE GUN.
No. 10,280. Reissued Feb. 6, 1883.
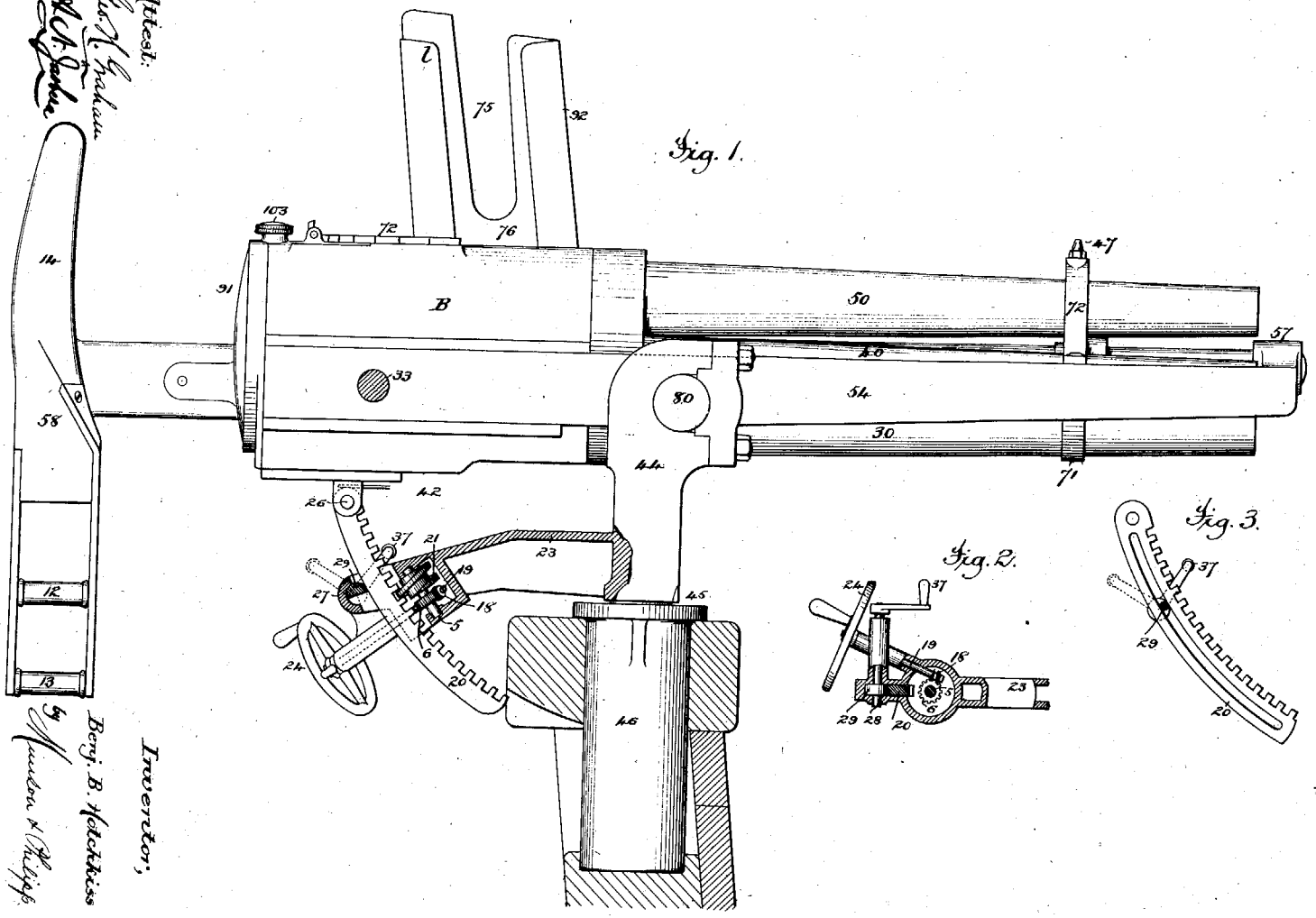
Attest:
Geo. H. Graham
A. S. Jackson
Inventor,
Benj. B. Hotchkiss
by Munson & Philipp
Att'ys.

2 Sheets—Sheet 2.
B. B. HOTCHKISS.
MACHINE GUN.
No. 10,280. Reissued Feb. 6, 1883.
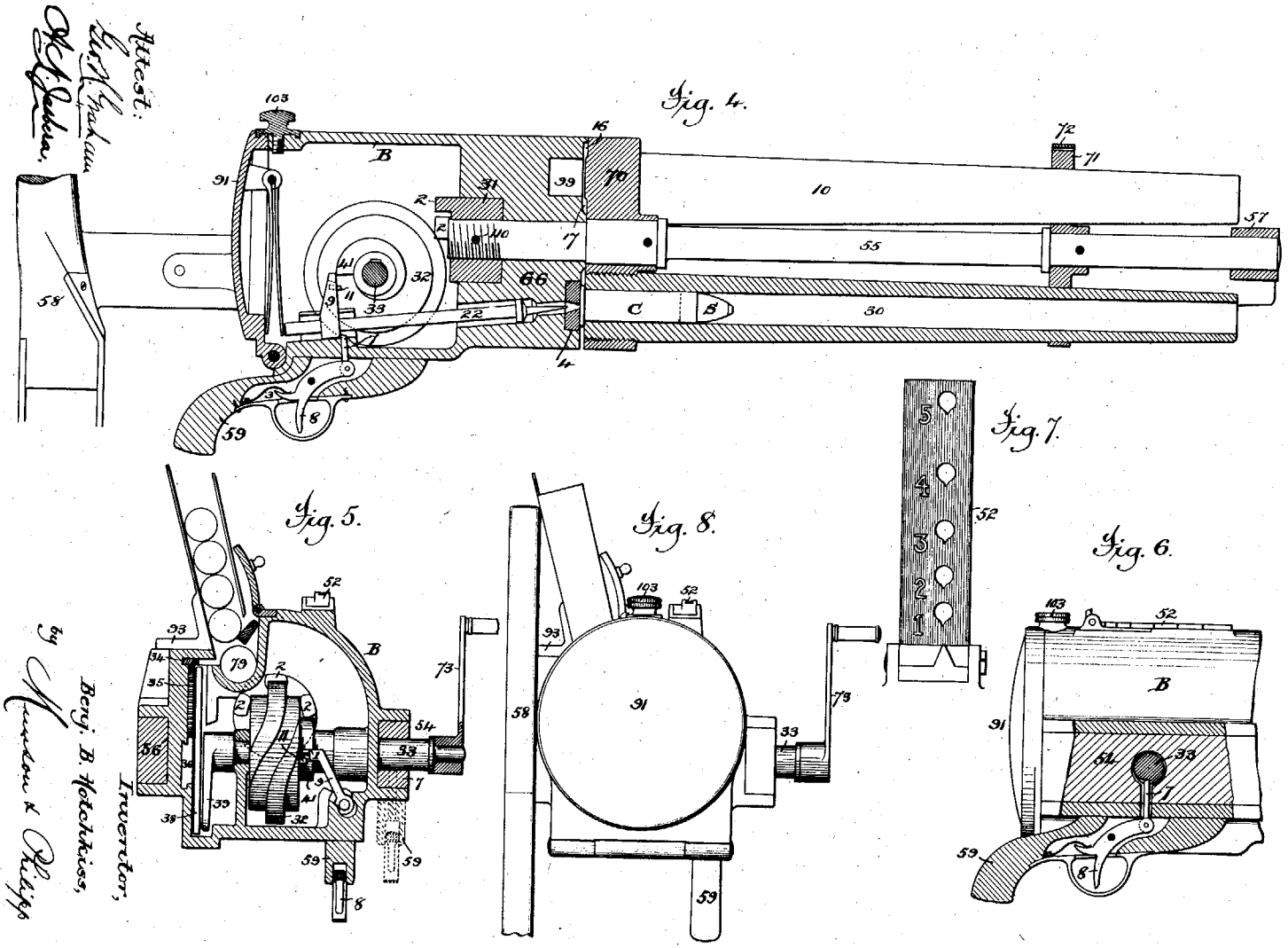
Attest:
Geo. H. Graham
A. S. Jackson.
Inventor,
Benj. B. Hotchkiss,
by Munson & Philipp
Attys.

UNITED STATES PATENT OFFICE.

BENJAMIN B. HOTCHKISS, OF NEW YORK, N. Y.

MACHINE-GUN.

SPECIFICATION forming part of Reissued Letters Patent No. 10,280, dated February 6, 1883.

Original No. 253,924, dated February 21, 1882. Application for reissue filed January 2, 1883. Patented in France July 9, 1878, in Germany October 28, 1879, and in England November 15, 1879.

*To all whom it may concern:*

Be it known that I, BENJAMIN B. HOTCHKISS, of New York, N. Y., a citizen of the United States, temporarily residing in the city of Paris, Department of the Seine, and Republic of France, have invented certain new and useful Improvements in Machine-Guns, fully described and represented in the following specification and the accompanying drawings, forming a part of the same.

This invention relates more particularly to that class of arms known as "machine-guns" or "revolving cannon;" but the said invention is in part applicable to all varieties of cannon, and even to fire-arms in general.

The improvements consist as follows: in a peculiar structure of shoulder-pieces for cannon and similar guns trained from the shoulder; in an improved training mechanism for mechanically elevating and depressing a cannon or similar gun; in an improved means for controlling the firing-pin of machine-guns; and in details of constructions and combinations of parts, too fully hereinafter set forth to need further preliminary mention.

Practical embodiments of the present improvements are illustrated in the accompanying drawings, which show in Figure 1 a longitudinal elevation of a revolving cannon or machine-gun; in Figs. 2 and 3, a sectional plan and side elevation of some of the details. These figures show more particularly the mechanism for elevating the gun, the form of segment illustrated by Fig. 3 being a modified construction. Fig. 4 represents a longitudinal sectional elevation of a revolving cannon or machine-gun, Fig. 5 being a cross-sectional elevation thereof, taken through the chamber of the operating mechanism; and Fig. 6 is an elevation, partly in section, of a modified construction of some of the parts. These figures (4, 5, and 6) illustrate more particularly the mechanism for discharging the arm. Fig. 7 illustrates an improvement in gun-sights. Fig. 8 represents a rear elevation of the gun.

The general structure of the revolving cannon or machine-gun in connection with which the present improvements are shown as applied differs in no essential particular in construction and operation from the gun illustrated and described in Letters Patent No. 211,849, granted to me, except in the improvements hereinafter specified and explained. The parts common to the gun herein shown and to that shown and described in said Letters Patent are distinguished by like letters in both cases, so that the specification of said Letters Patent may be read in explanation of the annexed drawings, and as setting forth the general character of the class of machine-guns to which some of the present improvements are applicable. The mechanisms and devices not explained in said patent will now be described.

The shoulder-piece 58 is here shown as modified in structure, in that its lower end is provided with handles 12 13, by which the hand of the arm depending from the shoulder of the gunner that presses against the shoulder-piece 58 may grasp one of the handles, and thus aid in the elevating, depressing, pointing, and aiming of the gun and prevent the shoulder and breast bearing 14 of the piece 58 from slipping over the body of the gunner. This structure may be used wherever a gun is supplied with a shoulder-piece to aid in training it. This shoulder-piece may be combined with a handle, 59, as in said patent, or with the mechanical training mechanism shown herein, which latter is provided as an aid to the shoulder-piece, especially when the cannon is very heavy, as in the case of large calibers. The manipulation of such cannon, both as regards its elevation and lateral training, is attended with great fatigue where the direct power of the gunner is employed, with the aid of the shoulder-piece, with or without the use of a handle attached beneath the rear end of the gun.

To obviate this difficulty and to render accurate pointing and aiming attainable with great facility in heavy cannon, a training mechanism is provided under the piece, by which the necessary movements of the gun for that purpose can be made and regulated with extreme facility without tiring the gunner, and whereby the gun is invariably sustained in its adjusted position. This training mechanism is composed of a segment-rack, 20, having inside teeth, which is attached to the under side of the breech of the gun and arranged to be engaged by a worm, 21, carried by a shaft, 5, that is journaled in an arm, 23, that projects rearward from the yoke 44, in which the trunnions of the gun are journaled, and which supports the gun so that it may swivel in a socket, 46. The shaft 5 has a worm-wheel, 6, fast upon it, with which engages a worm, 18, that is carried by a shaft, 19, that is journaled in an extension of the arm 23 and arranged to extend rearward, downward, and laterally toward the side of the gun, to which the shoulder-piece 58 is secured. This shaft 19 is provided with a hand-wheel, 24, which is thus brought into a position convenient to be grasped by the hand of the gunner manipulating the gun. When the shaft 19 is rotated it turns the worm-wheel 18 and causes the worm 21 to revolve, and as the worm 21 and the worm-wheel 18 cannot be displaced vertically in the line of the axis or shaft 5 it follows that the revolving of this worm 21 must cause the segment-rack 20 to rise or fall and impart a like movement to the piece, whereby the desired elevation of the gun will be obtained, while its lateral movement or traversing may be quickly accomplished by pressure upon the shoulder-piece, aided by the hand grasping either the hand-wheel 24 or the handle 59 when the elevation has been determined and lateral movement only is required. This handle 59 is omitted in Fig. 1 to avoid confusion in the drawings, and in aid of the present part of the description is to be considered merely as a handle depending from the rear of the gun at the side opposite that to which the shoulder-piece is attached. When points of widely-differing elevations have to be aimed at in rapid succession this mechanical mode of elevating and depressing the gun would prove too slow, and in such cases, in order to obtain the best results, the ability of the gunner may be relied upon to effect the aiming by training the gun with the aid of the shoulder-piece 58 and the handle 59, or any other portion of the gun which the hand of his free arm may conveniently seize or bear upon for the purpose. To permit such manipulation, it is necessary that the segment-rack 20 shall be arranged to be disengaged from the worm 21. To effect this, instead of fixing the segment-rack 20 rigidly on the body of the breech-piece B, it is attached thereto by means of a knuckle-joint, 26, so that under certain conditions it can swing backward away from and out of contact with the worm 21; and on the arm 23 a projection, 27, is provided with a slot, through which the segment-rack 20 passes downward, and which is also of sufficient length to permit a certain amount of swinging or back-and-forth motion of the segment-rack.

The projection 27 supports a shaft, 28, which carries a cam, 29, of the form represented, that is arranged at the rear edge of the segment-rack 20, as in Fig. 1, said shaft 28 being extended laterally outward and provided on its extremity with a small hand-crank, 37. When this crank is in the position represented in full lines, Fig. 1, the cam 29 re-presents its highest part toward the rear edge of the rack 20, and holds the same pressed inward in gear with the worm 21; but when the crank 37 is turned into the position indicated by dotted lines the low part of the cam is aligned with the edge of the rack, and thus permits the rack to recede or move backward in obedience to gravity or the pressure of a spring, 42, that is fixed to the breech B, and bears on the upper end of the segment-rack, as shown. When the rack is brought out of gear with the worm 21 the gun will be free to follow any impulse given to it by the hand or shoulder of the gunner. To again engage the parts and make the gun relatively fixed in any position reached, it is only necessary to turn the crank 37 back again into its original position, whereby the cam 29 will again press the rack into gear with the worm in opposition to the force of the spring 42 and hold it firmly engaged as long as desired. In Fig. 3 a modified construction of these parts is shown. The rack 20 is formed with a slot concentric to the pitch-line of its teeth, the cam 29 being given the form of an eccentric or crank pin extending from the end of the shaft carrying the hand-crank 37 and playing in the said slot, the rack being hinged to the rear end of the breech-piece in the same manner as in Fig. 1, but without the spring 42, which is omitted, as it is rendered superfluous by the action of the pin, which presses against one side or the other of the slot in the rack, according to the direction in which the crank 37 is turned, thus acting to positively move the rack into or out of gear with the worm 21, and to hold it firmly in the required position. This training mechanism may of course be attached and used with common forms of guns, but provided with the shoulder-piece, and the worm 21 might have substituted for it a direct-acting pinion.

As ordinarily constructed, the discharge of the cannon is effected by the continued turning of the crank 73, that is fixed on the outer extremity of the shaft 33, whereby also all the other parts of the mechanism of the piece are operated, which crank causes the cam 41 to revolve and move the firing-pin 22 rearwardly to cock it, and then permit its sudden forward movement by its arm 9 passing off from the high part of the cam, as is fully described in the aforesaid patent.

In guns of heavier calibers it has been found that the operation of pointing the gun, and also working the loading and firing mechanism, cannot well be performed by one and the same operator, though if these improvements are applied to a gun of small caliber designed to be operated by one person the arrangement of crank shown in said patent will be adopted. This or any other machine-gun requiring more than one person to manipulate it is provided with a peculiar discharging device now to be described, whereby the pointer of the gun may avail himself of the help of other men in elevating, depressing, or working the gun, and at the same time control their movements and determine the discharge of the gun. This is effected by the aid of a trigger so connected with and related to the mechanisms that it will operate to arrest the movements accomplished by the supernumerary aid, and also determine the discharge of the gun.

Machine-guns as heretofore constructed to be operated by two men, one of which effects the pointing while the other turns the crank which operates the loading and firing mechanism, have operated defectively, because from this combined operation it resulted that the firing of the piece did not always take place at exactly the moment desired, or when the gun was properly trained, for the reason that the discharge could not be sufficiently controlled by the pointer. This difficulty is obviated in these improvements by an arrangement whereby the pointing or training and the firing of the gun are accomplished by one man, while the second man imparts only the motive power to work the internal mechanisms of the gun. In accomplishing this the parts are so arranged that the rotation of the crank 73 simply operates the loading of the barrels, rotates the same, extracts the exploded shells, and effects the backward movement of the firing-pin to what may be termed its "cocked position." When during each revolution of the shaft 33 the mechanisms arrive in such position that the further turning of the crank 65 would allow the arm 9 of the trigger to escape from the high part of the cam 41, and thus discharge the gun, such movement is rendered impossible until the gun is properly trained and pointed—that is to say, the release of the firing-pin is brought within the control of the pointer by the provision of a trigger and sear, 7, corresponding in action to the trigger and sear of a rifle, that may be tripped by a slight movement of the finger of the pointer. To obtain this result there is arranged under the rear of the breech-piece a handle, 59, which may be formed more or less in shape of a pistol-grip, and which carries, in a manner somewhat corresponding to the arrangement of a pistol or rifle, a trigger, 8, preferably protected by a trigger-guard, as shown, and to the front end of which the trigger 8 is pivoted. The sear 7 of this trigger extends upward through a hole formed in the body of the breech-piece of the cannon, and said trigger is provided with a spring, 3, pressing against a tail-piece formed on the trigger, whereby the extremity of the trigger or its sear 7 is constantly projected upward. This pistol grip or handle 59 may be arranged so that the trigger may control the forward movement of the firing-pin in either of the following ways: The trigger may project into the canal which acts as a guide for the firing-pin, and there rise in front of the lower face of the arm 9 of the firing-pin or enter a recess formed in the body of said pin, the spring 3 and the beveled upper end of the trigger admitting of this being accomplished as the firing-pin moves rearward, and in order that no further rotation of the crank can take place when the firing-pin is cocked until after it is tripped.

The arm 9 of the firing-pin, which is acted upon by the cam 41, is provided with a small projection, 1, extending laterally toward the surface of the worm 32, and on the side of the stock carrying the worm 32 a second small projection or stop, 11, is provided in such a position that when the firing-pin is moved backward to its full extent by the cam 41 the projection 1 on the finger-pin and the projection 11 on the worm-stock will so be related that any attempt to turn the shaft 33, and consequently the cams 41 and worm 32, still further will cause the stop 11 to strike against the projection 1 on the arm 9 of the firing-pin 22, and thus arrest the further rotation of the shaft 33 and leave the firing-pin cocked.

The operation of this mechanism is as follows: Supposing the firing-pin to be in the forward position, having struck and ignited a cartridge in the barrel presented in position, the shaft 33 being now turned by the gunner or by an assistant by means of the crank 73, the revolution of this shaft will cause the firing-pin 22 to be forced backward by the cam 41 acting on its arm 9, and at the same time the worm 32 will cause the barrels to revolve, so as to present a charged barrel to the action of the firing-pin, all in the ordinary manner, as is set forth in said patent; but during the backward movement of the firing-pin the lower part of its arm 9, near the rear end, which serves as a guide, also acts on the inclined face of the sear 7 of the trigger, and thus pushes the same downward in opposition to the force of the spring 3. At the end of the backward stroke of the firing-pin, or when one revolution of the shaft 33 is nearly completed, the head of the trigger, being liberated by the arm 9 passing beyond it, rises in front of said arm of the firing-pin, and thus acts to retain the latter in its rearward position, even when on further turning the shaft 33 the high part of the cam 41 leaves the end of the arm 9 of the firing-pin. At this moment, when the cam 41 ceases to bear upon the arm 9, the lateral projection 11, formed on the worm-stock, strikes against the corresponding projection, 1, on the arm 9 of the firing-pin, and thus prevents the further rotation of the shaft 33. Under these conditions the firing-pin is what may be termed "cocked," and the gunner, if he has not previously done so, has now full time to point his piece, and can thereupon, without causing the slightest disturbance by bringing any heavy parts of the mechanism into motion, discharge the charged barrel at any desired moment by a slight pressure with his finger exerted on the trigger 8, whereby the sear is pulled downward, thus liberating the firing-pin, which flies forward with the force imparted to it by its spring 25 in the usual manner to effect the discharge of the cartridge or shell. At this forward motion of the firing-pin the projection 1 on its arm 9 slides from over the stop 11, formed on the side face of the worm-stock, thus liberating the arm 9 and leaving the parts free to be operated again in the manner described by a new revolution of the shaft 33.

In order to facilitate the release of the firing-pin 22, the upper surface of the stop 11 and the under surface of the projection 1 on the arm 9 are slightly beveled.

The pistol-grip, its trigger, and sear may be arranged as is shown by dotted lines in Fig. 5. In this arrangement the sear 7 projects through the under side of one bearing of the shaft 33, and coacts with a cam-shaped surface of the same, as is shown. This will of course suspend the rotation of the shaft 33 at a proper point to cause the cam 41 to hold the arm 9 of the firing-pin suspended, on the verge of being tripped, from off the high part of said cam, as in Fig. 4. Upon tripping the trigger 8 its sear 7 will be withdrawn from the shaft 33, and a slight rotative movement of the crank 73 will cause the discharge of the gun in the usual manner, as explained in said patent. If continuous firing is desired at any moment, the pointer has only to hold the trigger down firmly and order the crank to be turned continuously. Of course the sear and trigger may be made in one piece.

As it is obvious that other means may be arranged to produce exactly the same result—viz., making the striking motion of the firing-pin independent from the general mechanism and placing it entirely under the direct control of the gunner by means of a trigger or its equivalent—it is to be understood that this part of the invention is not limited to the exact means shown and described.

Heretofore the numbers on the sights of all kinds of fire-arms have been produced thereon by means of engraving the same in or through the metal. This method must be considered as very defective, insomuch that such engraved numbers are under some circumstances, especially at night, difficult to read, and often become by some accident or atmospheric influences absolutely illegible. These engraved sights are therefore replaced by novel ones which are formed of a thin plate of metal, 52, enameled in a bright color, preferably white, and on which the letters or other marks are written, also in enamel, but of a color having a strong contrast with the ground color. When the ground is, for instance, white, the marks will by preference be black; but it is evident that any other colors may be used with nearly equally good results. These sights are not only much more plainly visible when new, but they are also very durable, and can under no ordinary conditions lose their superior qualities.

What I claim is—

1. A shoulder-piece for attachment to guns to aid in training the same, consisting of an upper arm having a shoulder and breast bearing, and a lower arm provided with one or more handles, substantially as described.

2. The combination, with a cannon or similar gun provided with a shoulder-piece for training it, of a segment-rack attached to the rear part of the gun, and a worm, and means for rotating it, the latter being carried by an arm fixed on a support which participates in the horizontal movement of the gun, but is not affected by its vertical movement, all substantially as described.

3. The combination, with a cannon or similar gun, its carriage, and shoulder-piece, of a segment-rack, as 20, a worm-wheel, as 21, worm-wheel 6, and a worm, 18, carried by an operating-shaft, 19, extending rearward under the breech, substantially as described.

4. The combination, with a cannon or similar gun and its carriage, of an elevating and depressing mechanism consisting of a segment-rack depending from the breech, a worm or similar driving-wheel co-operating with said rack, and means, substantially as described, for engaging and disengaging said rack and driving-wheel.

5. The combination, with a cannon or similar gun and its carriage, of a swinging segment-rack, a driving-wheel, as 21, means for rotating the same, and a cam, as 29, operating to hold said rack and wheel engaged, or to admit of their disengagement, substantially as described.

6. The combination, with the operating mechanism in a machine-gun, of an independent trigger, arranged, substantially as described, to arrest the movement of the operating mechanism and control the firing action.

7. The combination, with a cannon mounted upon trunnions, of a shoulder-piece and a mechanical elevating mechanism constructed to be thrown into and out of operation, all substantially as described.

8. The combination, with a revolving cannon or other system of machine-gun, of a trigger arranged and operating substantially as shown and described, whereby the discharging movement of the firing-pin is controlled, independently of the cocking action thereof, through the ordinary movements of the gun mechanism.

9. The trigger operating to arrest and liberate the firing-pin, in combination with the projection 1 on the firing-pin, arm 9, and the stop 11 on the face of the worm-stock, whereby the continuance of the revolution of the shaft 33 is prevented when the gun is cocked, substantially as described.

10. The combination, with a pivoted cannon or similar gun having a shoulder-piece at one side of the breech thereof, of a handle or hand grip or grasp at the other side of the breech, substantially as described.

In testimony whereof I have hereunto set my hand.

B. B. HOTCHKISS.

In presence of—
ROBT. M. HOOPER,
EDWIN AGOSTINY.